United States Patent [19]

Blaser

[11] 4,345,149
[45] Aug. 17, 1982

[54] DISC-SHAPED CENTERING FIXTURE FOR OPTICAL ENCODERS

[76] Inventor: Anton J. Blaser, 700 E. Mason, Santa Barbara, Calif. 93103

[21] Appl. No.: 185,145

[22] Filed: Sep. 8, 1980

[51] Int. Cl.³ ............................................. G01D 5/34
[52] U.S. Cl. ................................. 250/231 SE; 29/271
[58] Field of Search ............. 250/231 SE, 237 G, 239; 356/395, 396, 399, 400; 340/347 P; 29/271

[56] References Cited

U.S. PATENT DOCUMENTS

| 3,900,732 | 8/1975 | Costales | 29/271 |
| 4,209,692 | 6/1980 | Hudspeth | 250/231 SE |

Primary Examiner—David C. Nelms
Attorney, Agent, or Firm—Ralph B. Pastoriza

[57] ABSTRACT

The mounting member portion carrying the light source in an optical encoder assembly is properly centered on a motor casing with respect to the motor shaft by a centering fixture in the form of a disc-shaped element. This disc-shaped element has a central bore of diameter corresponding to the diameter of the motor shaft and an annular peripheral downwardly depending lip at a precise radial distance from the geometrical center of its bore. This radial distance corresponds precisely to the radial distance between the geometrical center of the mounting member and its circular periphery such that the disc-shaped element can overlie the mounting member with its lip engaged about the circular periphery of the mounting member and its central bore receiving the motor shaft. The geometry is such that the mounting member is necessarily held in a precise concentric relationship with respect to the motor shaft by means of the centering fixture in the form of the disc-shaped element. The mounting member can then be secured to the motor casing itself and thereafter the centering fixture removed and the remaining components assembled.

5 Claims, 3 Drawing Figures

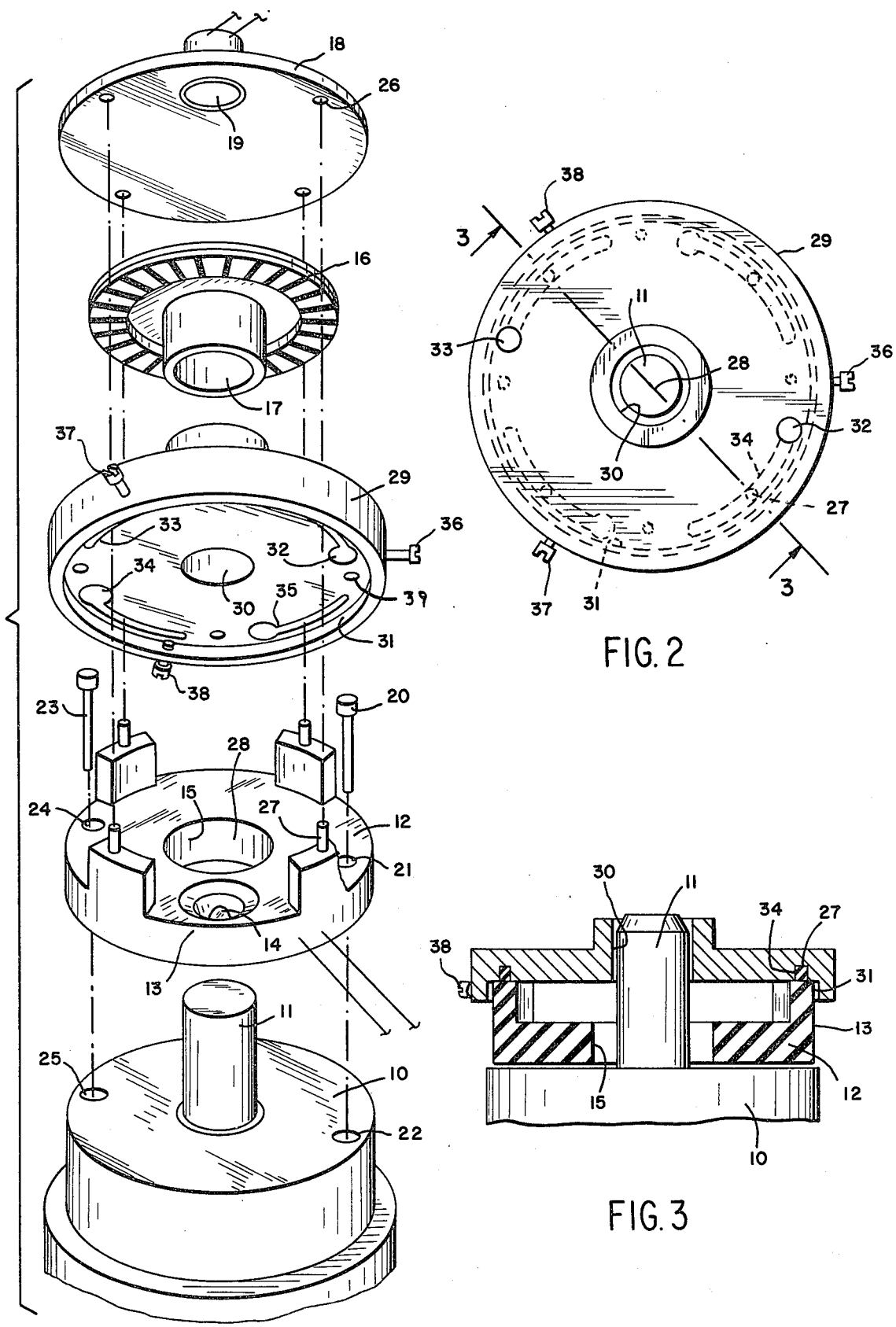

DISC-SHAPED CENTERING FIXTURE FOR OPTICAL ENCODERS

This invention relates generally to optical encoders provided in kit form for assembly on motor shafts to provide an output signal of a frequency determined by the R.P.M. of the motor. More particularly, the invention has to do with a unique centering fixture in combination with an optical encoder for facilitating the assembly of the optical encoder on the motor.

BACKGROUND OF THE INVENTION

Optical encoders or tachometers are well known in the art. Basically, these devices comprise a stationary light source arranged to be mounted on a motor close to the motor shaft, a stationary receiving photo electric cell in alignment with the light source and a rotating shutter arranged to be secured to the motor shaft to rotate between the light source and photo cell and thus optically generate a series of pulses of frequency corresponding to the R.P.M. of the motor. In these assemblies it is vitally important that the light source and photo cell be properly aligned with respect to the rotating shutter in order that usable output pulses are properly generated. Any misalignment could result in the absence of pulses or very weak pulses if the full apertures defined by the rotating shutter are not utilized.

There is generally no problem when an optical encoder is installed on a motor in the factory. Proper alignment jigs and the like are readily available and once the selection is complete on the motor, there is ordinarily no problem of misalignment unless an ultimate user attempts to disassemble the optical encoder from the motor and attempts to reassemble the same himself.

On the other hand, it is presently common practice to provide optical encoder kits which may be shipped directly to a user and assembled by the user himself on a motor. Normally, the basic component of the assembly constitutes a mounting member carrying the light source. This member is provided with a central opening normally of a size greater than the diameter of the motor shaft of any particular motor with which the encoder is to be used. The larger sized opening is necessary to provide a definite clearance between the rotating shaft and the mounting member itself carrying the light source which latter member is fixed to the motor casing in a position surrounding the shaft and is stationary. The next component of the assembly constitutes the shutter member which is mounted directly to the motor shaft. Finally, an appropriate top cover carrying the photo cell detector overlies the shutter member and is affixed to the mounting member so that the shutter member is sandwiched therebetween and will rotate between the light source and photo cell.

Because of the larger sized central opening of the mounting member relative to the motor shaft, in affixing the mounting member to the motor casing in a stationary position, it is essential that it be exactly coaxially centered relative to the motor shaft. That is, the outer circular periphery of the mounting member must be exactly concentric with the axis of the motor shaft. Otherwise, the rotating shutter which is affixed to the shaft will be out of alignment with the light passed from the light source to the photo cell all as described heretofore.

In view of the foregoing, it is customary to provide a centering means such as a bar with a V-groove affixed to the mounting member at the factory to permit exact centering of the mounting member prior to securing it to the motor. After securement of the mounting member, this centering bar or fixture can be disconnected. However, if it is ever desired to remove the optical encoder and place it on another motor or even reassemble it on the same motor, the mounting member must be sent back to the factory for proper securement of the bar fixture thereto in order that proper centering can again be achieved.

The foregoing problem has been solved in the provision of optical encoders in kit form in accord with the teachings of my prior U.S. Pat. No. 4,102,028 issued July 25, 1978. In my aforesaid patent, I disclose a centering fixture which can be provided with the kit and which functions to enable precise centering of the mounting member to a motor casing in order to solve the above-noted problems without having to send the assembly back to the factory.

However, effective operation of my centering fixture as described in the above noted patent depends on a precise central bore opening in the mounting member of a specific diameter. If the diameter of this central opening in the mounting member should be different, then a different centering fixture must be provided. Moreover, should there be any minor variations in the size of the central opening of the mounting fixture, the centering fixture as described in my above patent will not function properly.

BRIEF DESCRIPTION OF THE PRESENT INVENTION

With the foregoing considerations in mind, the present invention contemplates the provision of an improved centering fixture for optical encoders which does not rely on a consistent accurate bore diameter for the mounting member but rather is designed to precisely locate the center of the outer periphery relative to the center of the motor shaft to thereby assure the desired alignment of the encoder components.

Briefly, the centering fixture of the present invention comprises a disc-shaped element having a central bore of diameter corresponding to the diameter of the motor shaft to receive the shaft in a friction fit. The element further includes a downwardly extending peripheral lip having an inside diameter corresponding to the outside diameter of the circular periphery of the mounting member making up one of the components of the optical encoder.

With the foregoing arrangement, when the shaft is received in the bore of the centering fixture and the lip is coaxially positioned over the circular periphery of the mounting member, the mounting member is centered with its circular periphery precisely concentric with the motor shaft so that it may then be secured to the motor with assurance that it will be in proper alignment with the remaining components of the encoder when the same are assembled after removing the centering fixture.

It will be appreciated that the exact centering of the mounting member is carried out even though the central opening in the mounting member may vary in size among the various encoders.

BRIEF DESCRIPTION OF THE DRAWINGS

A better understanding of the invention will be had by referring to a preferred embodiment thereof illustrated in the accompanying drawings in which:

FIG. 1 is an exploded perspective view of the basic components making up an optical encoder together with the centering fixture of this invention preparatory to assembling the components on a motor;

FIG. 2 is a top plan view looking along the axis of the motor shaft of the centering fixture in position on the mounting member in carrying out a centering operation; and FIG. 3 is a fragmentary cross-section taken in the direction of the arrows 3—3 of FIG. 2.

DETAILED DESCRIPTION OF THE PREFERRED EMBODIMENT

Referring first to the lower portion of FIG. 1, there is shown a motor casing 10 having a shaft 11 extending upwardly therefrom.

The optical encoder itself includes a mounting member 12 having a circular periphery 13 and carrying a light source 14 adjacent to a point on the periphery. Mounting member 12 is further provided with a central opening 15 of larger diameter than the diameter of the motor shaft 11 so as to surround this shaft when the mounting member 12 is secured to the casing without touching the shaft.

Referring to the upper portion of FIG. 1, the encoder further includes a shutter component 16 having a central hub 17 arranged to be received on the shaft 11 in a friction fit so that the shutter 16 will rotate with the shaft.

The assembly is completed by the provision of a cover member 18 carrying a photoelectric cell 19 adjacent to a peripheral point as shown.

In assembling the encoder, the mounting member 12 is secured to the motor casing 10 by way of a first screw 20 passing through an opening 21 in the mounting member 12 into a tapped hole 22 in the casing 10 and a second screw 23 passing through another opening 24 in the mounting member 12 into a tapped hole 25 in the casing member on the diametrically opposite side of the shaft 11.

Next, the shutter 16 has its central hub portion 17 secured to the shaft 11 which is now extending upwardly through the central opening 15 of the mounting member 12. Thereafter, the top cover 18 is secured to the top of the mounting member 12.

As indicated in FIG. 1, top cover 18 has holes such as indicated at 26 for cooperation with appropriately upwardly extending dowel pins, one of which is shown at 28 at the periphery of the mounting member 12. The position of the holes and dowel members are such that the photoelectric cell 19 will be properly aligned with the light source 14 on the mounting member 12 when the components are assembled assuming that the mounting member 12 is properly concentric with the motor shaft 11.

It will be understood that the shutter 16 rotates with the shaft between the light source and photoelectric cell so that a modulated light signal is generated at a frequency corresponding to the RPM on the motor.

In order to assure that the exact geometrical center of the mounting fixture 12 shown at 28 with respect to the circular periphery 13, is exactly concentric with the motor shaft 11 prior to tightening of the screws 20 and 23, there is provided the centering fixture of this invention. This centering fixture is shown at 29 in FIG. 1, and takes a form of a disc-shaped element having a central bore 30 arranged to receive the shaft 11 in a friction fit.

The outter periphery of the disc-shaped element making up the centering fixture 29, terminates in a downwardly extending annular lip 31. The inside diameter of this lip 31 is made exactly equal to the outside diameter of the circular periphery 13 of the mounting member 12 so that the geometrical center 28 of the mounting member will be coincident with the center of the bore 30 of the centering fixture when the annular lip 31 engages over the circular pheriphery 13 of the mounting member.

As shown in FIG. 1, the disc-shaped centering fixture 29 has two openings, 32 and 33 for registration with the openings 21 and 24 in the mounting member 12 so that the screws 20 and 23 may be passed down through the centering fixture 29 to secure the mounting member in place when the centering fixture is holding the same.

It will also be noted in FIG. 1, that the underside of the centering fixture 29 includes annular slot segments such as indicated at 34. The slot segments are provided to accommodate the upwardly extending dowels on the mounting member 12 such as the dowel 27.

Referring to FIG. 2, the centering fixture 29 is shown with the shaft 11 of the motor received within the central bore 30 and the annular lip 31 overlying the circular periphery of the mounting member 12 described in FIG. 1. It will be noted by the phantom lines that the various dowels are received within the annular segments so as not to interfere with proper positioning of the centering fixture on the top portion of the mounting member 12.

FIG. 3 illustrates in cross-section the manner in which the slot segments such as the annular slot segments 34 accommodates the dowel pins, such as the dowel pin 27. Further, it will be noted that the annular lip 31 snugly engages the outter periphery 13 of the mounting member 12 and since the annular lip 31 is exactly concentric with the center of the bore 30 which in turn is concentric with the shaft 11, the mounting member 12 is necessarily concentric to the shaft 11 when held by the centering fixture.

After the screws 20 and 23 have been tightened, as described heretofore, the centering fixture 29 is removed from the shaft 11 and then the remaining components in the form of the shutter 16 and top cover 18 are assembled.

Since the centering fixture indexes to the outter annular periphery of the mounting member 12, concentricity and proper alignment is assured even though the central opening 15 in the mounting member may not always be of a consistent dimension. Should there be a thermally caused changed in the outer dimension of member 13 or in the inner diameter of the centering fixture, small screws 37, 37 and 38 positioned circumferentially at 120 degrees may be provided as shown in FIG. 1 to compensate, each screw being threaded in an equal amount to engage the outer wall of member 13 when centering.

As another alternative, the centering fixture may be provided with indexing holes such as at 39 in FIG. 1 in precise alignment with the dowel pins to receive the same in lieu of the arcuate slots.

I claim:

1. An optical encoder assembly and centering fixture to be used on a motor shaft of given diameter, including, in combination:

(a) a mounting member having a circular periphery with a light source adjacent to a point on said periphery and having a central opening of larger size than said given diameter of said shaft of said motor so as to surround such shaft without touching the shaft and wherein the light source is positioned at a proper radial distance from the axis of said shaft for proper alignment with the remaining components of the assembly only when the mounting member is centered on the motor with said shaft extending through the central opening in exact concentric relationship with said circular periphery;

(b) a centering fixture comprising a disc-shaped element having a central bore of diameter corresponding to said given diameter of said shaft to receive said shaft in a friction fit, and a downwardly extending peripheral lip having an inside diameter corresponding to the outside diameter of said circular periphery of said mounting member whereby when said shaft is received in said bore and said lip is coaxially positioned on said periphery of said mounting member, said mounting member is centered with its circular periphery precisely concentric with said shaft so that it may then be secured to said motor with assurance that it will be in proper alignment with the remaining components of said encoder assembly when the same are assembled after removing the centering fixture.

2. The subject matter of claim 1, in which said optical encoder further includes a shutter having a central hub receivable on said shaft for rotation therewith, and a top cover carrying a photoelectric cell adjacent to a point on the periphery on the cover and including openings, said mounting member having a upwardly extending dowels from its periphery for registration with said openings of said top cover when the photoelectric cell on the cover is in proper alignment with the light source on said mounting member, said centering fixture comprising the disc-shaped element having annular slot segments on its underside adjacent to its lip spaced slightly radially inwardly of the lip positioned to receive the upwardly extended dowels on said mounting member when the centering fixture is positioned thereover for centering said mounting member.

3. The subject matter of claim 2, in which said motor casing includes tapped openings on either side of said shaft, and said mounting member includes screw openings so that screws can be passed down the screw openings into said tapped openings for securing the mounting member to the motor casing, said centering fixture comprising the disc-shaped element having openings through its upper portion in positions to register with the openings in said mounting member when the centering fixture is positioned on said mounting member for centering the same relative to said shaft whereby the screws can be passed through the openings in the fixture to secure the mounting member to the motor casing.

4. The subject matter of claim 1, in which said lip includes three set screws positioned circumferentially at 120 degrees which may be equally threaded inwardly to engage the said periphery to compensate for dimensional changes.

5. The subject matter of claim 1, in which said disc-shaped element includes small indexing holes positioned to receive the upwardly extending dowels on said mounting member when the centering fixture is centered thereover for centering said mounting member.

* * * * *